US012797881B2

(12) United States Patent
Lin et al.

(10) Patent No.: US 12,797,881 B2
(45) Date of Patent: Nov. 17, 2026

(54) PRESSING PUMP AND LIQUID CONTAINER

(71) Applicant: ZHONGSHAN LUENCHEONG DISPENSING PUMP LTD., Zhongshan (CN)

(72) Inventors: Tianda Lin, Zhongshan (CN); Hengjin Mo, Zhongshan (CN)

(73) Assignee: ZHONGSHAN LUENCHEONG DISPENSING PUMP LTD., Zhongshan (CN)

( * ) Notice: Subject to any disclaimer, the term of this patent is extended or adjusted under 35 U.S.C. 154(b) by 176 days.

(21) Appl. No.: 18/944,401

(22) Filed: Nov. 12, 2024

(65) Prior Publication Data

US 2025/0091070 A1 Mar. 20, 2025

Related U.S. Application Data

(63) Continuation of application No. PCT/CN2023/092524, filed on May 6, 2023.

(30) Foreign Application Priority Data

Aug. 5, 2022 (CN) ........................ 202210943956.X

(51) Int. Cl.
*B05B 11/10* (2023.01)
*B65D 51/16* (2006.01)

(52) U.S. Cl.
CPC ...... *B05B 11/1042* (2023.01); *B65D 51/1672* (2013.01)

(58) Field of Classification Search
CPC . B05B 11/0044; B05B 11/1042; B05B 11/10; B05B 11/1001; B05B 11/1023; B05B 11/1025; B05B 11/1045; B05B 11/1047; B05B 11/105; B05B 11/1066; B05B 11/1067; B65D 51/1672
See application file for complete search history.

(56) References Cited

U.S. PATENT DOCUMENTS

| | | | | |
|---|---|---|---|---|
| 4,071,172 A * | 1/1978 | Balogh | ................. | F04B 53/103 222/340 |
| 9,908,132 B2 * | 3/2018 | Dalisay | ................. | B05B 11/106 |

FOREIGN PATENT DOCUMENTS

| | | |
|---|---|---|
| CN | 112810992 A | 5/2021 |
| CN | 213621239 U | 7/2021 |
| CN | 214398005 U | 10/2021 |
| CN | 216581924 U | 5/2022 |

(Continued)

*Primary Examiner* — Steven M Sutherland
(74) *Attorney, Agent, or Firm* — Birchwood IP

(57) ABSTRACT

The present invention discloses a pressing pump and a liquid container. The pressing pump comprises a pump body, a one-way valve, a valve stem assembly, a pressing head and an annular part. The pump body is provided with an accommodating cavity. The annular part is inserted into the accommodating cavity, and the outer circumference of the annular part sealably abuts against an inner wall of the accommodating cavity. The pressing head is provided with a second channel which communicates with the first channel. The second channel has a first opening which is disposed on the side wall of the pressing head close to the pump body and is located at an outer side of the annular part. The pressing pump provided in the present invention can reduce the circumstances in which external moisture enters the interior of the pump body, and improve the waterproof performance.

10 Claims, 6 Drawing Sheets

(56) References Cited

FOREIGN PATENT DOCUMENTS

| | | | |
|---|---|---|---|
| CN | 114789850 | A | 7/2022 |
| CN | 115489869 | A | 12/2022 |
| CN | 218318321 | U | 1/2023 |
| JP | 2017214126 | B2 | 12/2017 |
| KR | 20140026694 | A1 | 3/2014 |
| KR | 101479223 | B1 | 1/2015 |

* cited by examiner

C

PRESSING PUMP AND LIQUID CONTAINER

CROSS-REFERENCE TO RELATED APPLICATIONS

This application is a continuation of International Patent Application No. PCT/CN2023/092524, filed on May 6, 2023, which claims the priority and benefit of Chinese patent application number 202210943956X, filed on Aug. 5, 2022 with China National Intellectual Property Administration, the entire contents of which are incorporated herein by reference.

TECHNICAL FIELD

The present invention relates to the technical field of liquid pumps, and in particular to a pressing pump and a liquid container.

BACKGROUND

A pressing pump is used for squeezing liquid out of a container, and generally comprises a pump body and a valve stem assembly which is movably inserted into the pump body. A bottom end of the pump body is provided with a liquid inlet. A one-way valve is arranged at the liquid inlet. When the valve stem assembly moves away from the liquid inlet at the bottom end of the pump body, negative pressure is formed in a liquid storage cavity at the bottom end of the pump body, such that the liquid storage cavity suctions liquid from the liquid inlet. When the valve stem assembly moves close to the liquid inlet, liquid in the liquid storage cavity is squeezed into a liquid outlet channel in the valve stem assembly. In existing pressing pumps, during the process of suctioning liquid, air outside a container generally enters a pump body via a gap between a pump body and a valve stem assembly, and then enters the container via a ventilation hole on the pump body. This air supplementing mode is not reasonably designed, as it is easy for external moisture to enter the pump body via the gap between the pump body and the valve stem assembly, and there is a need to improve waterproof performance.

SUMMARY

The present invention aims to solve at least one of the technical problems existing in the prior art. To this end, the present invention provides a pressing pump, which can reduce the circumstances in which external moisture enters the interior of the pump body, and improve the waterproof performance.

The present invention further provides a liquid container provided with the above pressing pump.

A pressing pump according to a first embodiment of the present invention comprises a pump body, a one-way valve, a valve stem assembly, a pressing head and an annular part. The pump body is provided with an accommodating cavity. The bottom of the accommodating cavity is provided with a liquid inlet. The one-way valve is arranged at the liquid inlet. The valve stem assembly is movably arranged in the accommodating cavity. The valve stem assembly is mounted with a piston. The piston is located in the accommodating cavity. A circumferential edge of the piston is fitted to and abuts against an inner wall of the accommodating cavity. The valve stem assembly is provided with a liquid outlet channel which communicates with the accommodating cavity. The valve stem assembly and the piston are capable of being lifted and lowered relative to the liquid inlet. The pressing head is located outside the pump body and is connected to one end of the valve stem assembly. The pressing head is provided with a liquid outlet nozzle which communicates with the liquid outlet channel. The annular part is arranged at the outer circumference of one end of the valve stem assembly and is connected to a side wall of the pressing head close to the pump body. The annular part is inserted into the accommodating cavity, and the outer circumference of the annular part sealably abuts against the inner wall of the accommodating cavity. The annular part is provided with a first channel which communicates with the accommodating cavity, or a first channel which communicates with the accommodating cavity is provided between the annular part and the valve stem assembly. The pressing head is provided with a second channel which communicates with the first channel. The second channel has a first opening. The first opening is disposed on the side wall of the pressing head close to the pump body and is located at an outer side of the annular part. The outer circumference of the pump body is provided with a ventilation hole capable of communicating with the accommodating cavity. The ventilation hole is located between the annular part and an end face of the piston close to the liquid inlet. When the piston is close to the liquid inlet, the ventilation hole and the accommodating cavity are in a communicated state.

The pressing pump according to the embodiment of the present invention at least has the following beneficial effects: since the annular part abuts against the inner wall of the accommodating cavity in a closed manner, during an air supplementing process, it is difficult for external air and moisture to enter the accommodating cavity from between the annular part and the inner wall of the accommodating cavity. The external air needs to pass through the second channel, enter the first channel, then enter the accommodating cavity, and finally enter a container by means of the ventilation hole. By using the above arrangements, a direction in which air enters the second channel from the first opening is different from a direction in which air flows in the second channel. The direction in which air flows in the second channel is also different from a direction in which air flows in the first channel. In this way, the length of an air supplementing path may be increased, and the air supplementing path is caused to be tortuous. It is not easy for external moisture to enter the first channel from the second channel and further enter the accommodating cavity of the pump body, such that the circumstances in which external moisture enters the interior of the pump body is reduced, and the waterproof performance is improved.

According to some embodiments of the present invention, there is a first gap between the annular part and the valve stem assembly. The first channel is the first gap.

According to some embodiments of the present invention, the second channel has a second opening which is located on the side wall of the pressing head close to the pump body and is located at an inner side of the annular part. The second opening is communicated with the first channel.

According to some embodiments of the present invention, the pressing head is provided with a first through hole in an axial direction of the valve stem assembly. A closing cover is mounted at one end of the first through hole away from the valve stem assembly. The closing cover and a side wall of the first through hole are enclosed to form the second channel.

According to some embodiments of the present invention, the closing cover is provided with an annular brim. A side wall of the pressing head away from the pump body is provided with an annular clamping groove. The first through hole is located at an inner side of the clamping groove. The brim is embedded in the clamping groove.

According to some embodiments of the present invention, the pump body comprises a tubular body and a locking member which is embedded in an upper end of the body. A liquid storage cavity is formed inside the body and below the locking member. The liquid inlet communicates with a lower part of the liquid storage cavity. The locking member is provided with a mounting cavity. The mounting cavity communicates with the liquid storage cavity by means of a second through hole. The accommodating cavity comprises the liquid storage cavity, the mounting cavity and the second through hole. The piston is located in the liquid storage cavity.

According to some embodiments of the present invention, there is a second gap between a lower end of the locking member and an inner wall of the body. The ventilation hole is located at an upper side of a lower end face of the locking member and communicates with the second gap.

According to some embodiments of the present invention, when the piston is away from the liquid inlet, an upper end of the piston can block the second gap.

According to some embodiments of the present invention, a first pushing part and an annular second pushing part are arranged at the outer circumference of the valve stem assembly. The piston is movably located between the first pushing part and the second pushing part. The second pushing part is located below the piston. An inlet of the liquid outlet channel is located between the first channel and the second pushing part. A lower end face of the piston can be away and separated from or close and fitted to the second pushing part, such that the liquid outlet channel communicates with or is disconnected from the liquid storage cavity.

A liquid container according to a second embodiment of the present invention comprises the above pressing pump.

The liquid container according to the embodiment of the present invention has at least the following beneficial effects: by using the above pressing pump, the circumstances in which external moisture enters the container from the pressing pump to cause contamination can be reduced, and the waterproof performance is improved.

Additional aspects and advantages of the present invention will be given in part in the following descriptions, and become apparent in part from the following descriptions, or be learned from the practice of the embodiments of the present invention.

BRIEF DESCRIPTION OF DRAWINGS

The above and/or additional aspects and advantages of the present invention will become apparent and more readily appreciated from the following descriptions made with reference to the following drawings, in which.

Figure 1:
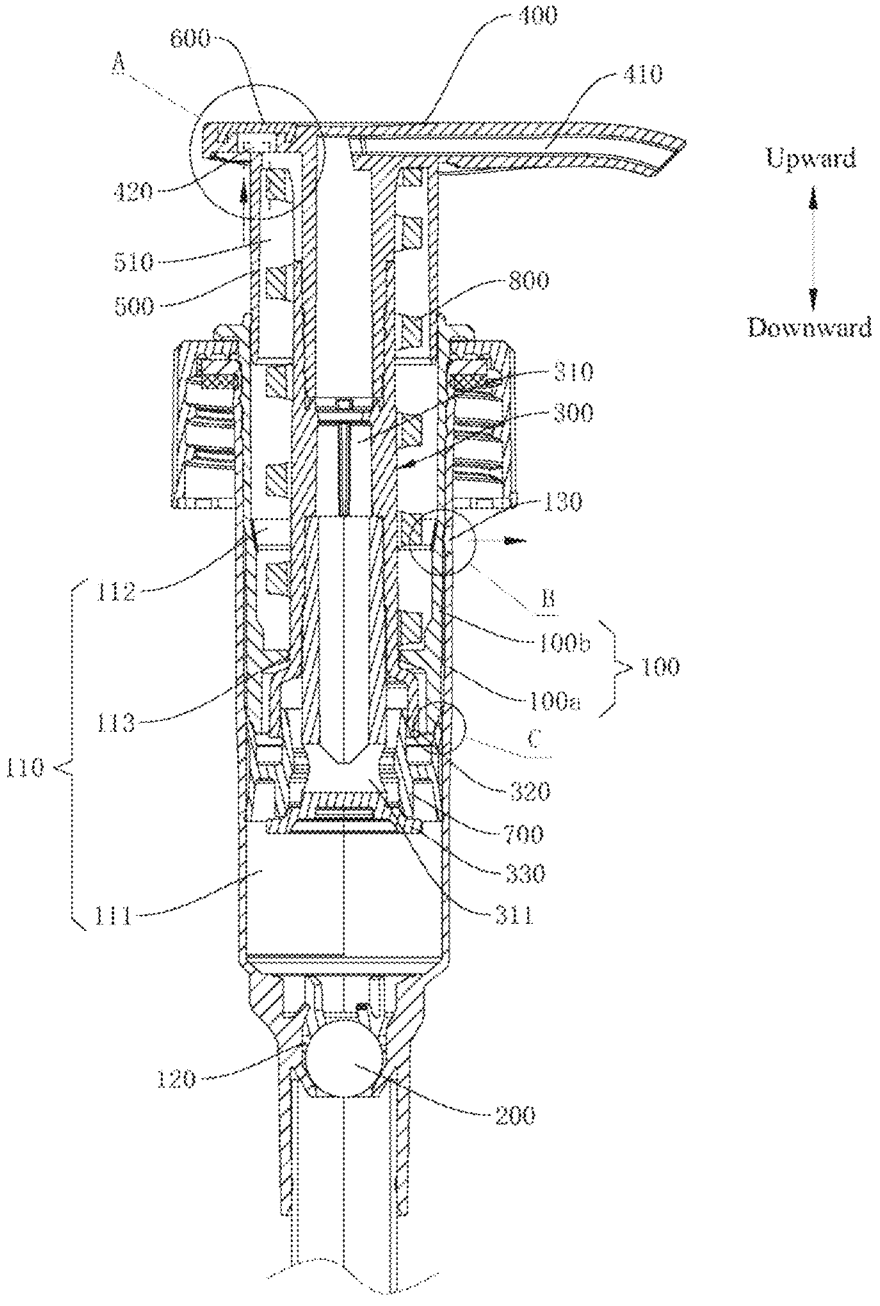
FIG. 1 is an internal schematic diagram of a pressing pump of an embodiment of the present invention.

Reference numerals are as follows:

pump body 100, body 100*a*, locking member 100*b*, mounting cavity 112, second through hole 113, liquid storage cavity 111, accommodating cavity 110, liquid inlet 120, ventilation hole 130, second gap 140, one-way valve 200, valve stem assembly 300, liquid outlet channel 310, inlet 311, first pushing part 320, second pushing part 330, pressing head 400, liquid outlet nozzle 410, second channel 420, first through hole 420*a*, first opening 421, second opening 422, clamping groove 430, annular part 500, first channel 510, closing cover 600, brim 610, piston 700, and spring 800.

DESCRIPTION OF EMBODIMENTS

The embodiments of the present invention are described in detail below, and examples of the embodiments are illustrated in the drawings, in which same or similar reference numerals throughout represent same or similar elements or elements with same or similar functions. The embodiments described below with reference to the drawings are exemplary, which are only used to explain the present invention and cannot be understood as limiting the present invention.

In the statement of the present invention, it should be understood that orientation statements, such as orientation or position relationships indicated by up, down, front, back, left, right, etc., are based on the orientation or position relationships shown in the accompanying drawings and are only to facilitate the statement of the present invention and simplify the statement, rather than indicate or imply that the device or element referred to must have a specific orientation, be constructed and operate in a specific orientation, and therefore should not be understood as a limitation to the present invention.

In the statement of the present invention, "several" means one or more, "a plurality of" means two or more, "greater than", "less than", and "more than", etc. are understood to exclude the original number, and above, below, within, etc. are understood to include the original number. If there is a statement of first and second, it is only for the purpose of distinguishing technical features, and cannot be understood as indicating or implying the relative importance or implicitly indicating the number of indicated technical features or implicitly indicating the order of indicated technical features.

In the statement of the present invention, unless otherwise explicitly specified, words such as setting, installation, and connection should be understood in a broad sense. Those skilled in the art can reasonably determine the specific meanings of the above words in the present invention in combination with the specific content of the technical solution.

Figure 2:
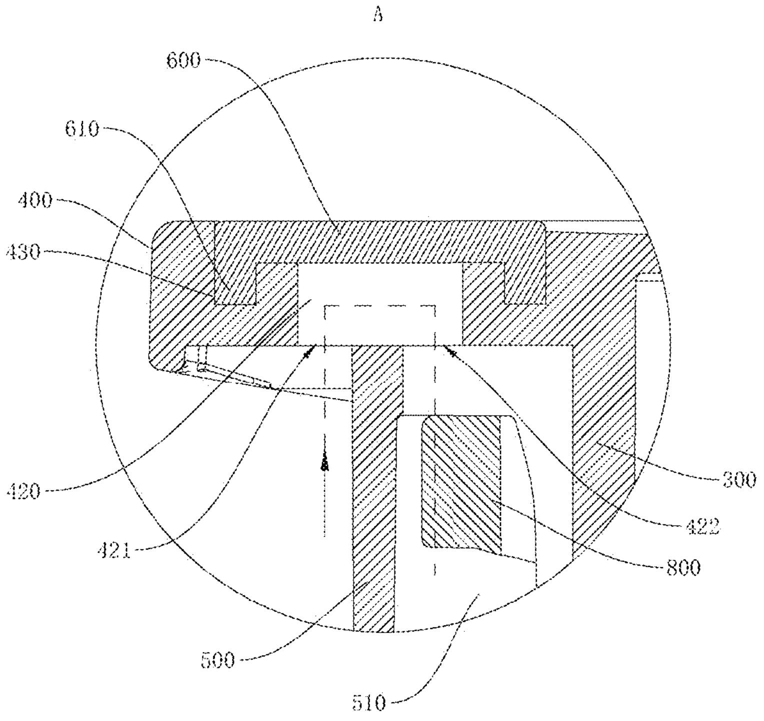
FIG. 2 is an enlarged view at A in FIG. 1.
Figure 3:
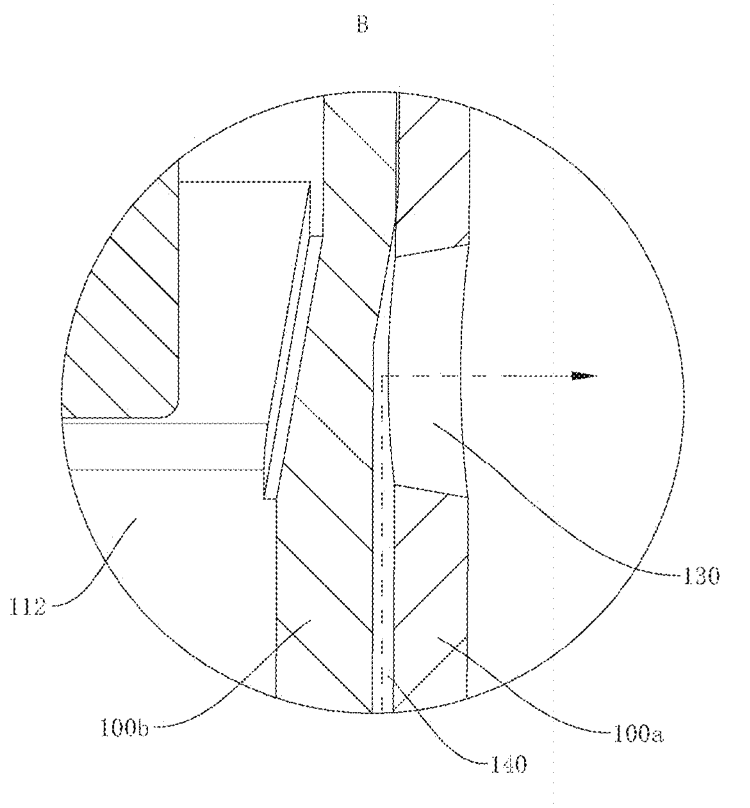
FIG. 3 is an enlarged view at B in FIG. 1.

Referring to FIGS. 1 to 3, a pressing pump according to a first embodiment of the present invention comprises a pump body 100, a one-way valve 200, a valve stem assembly 300, a pressing head 400 and an annular part 500. The pump body 100 is provided with an accommodating cavity 110. The bottom of the accommodating cavity 110 is provided with a liquid inlet 120. The one-way valve 200 is arranged at the liquid inlet 120. The valve stem assembly 300 is movably arranged in the accommodating cavity 110. The valve stem assembly 300 is mounted with a piston 700. The piston 700 is located in the accommodating cavity 110. A circumferential edge of the piston 700 is fitted to and abuts against an inner wall of the accommodating cavity 110. The valve stem assembly 300 is provided with a liquid outlet channel 310 which communicates with the accommodating cavity 110. The valve stem assembly 300 and the piston 700 are capable of being lifted and lowered relative to the liquid inlet 120. The pressing head 400 is located outside the pump body 100 and is connected to one end of the valve stem assembly 300. The pressing head 400 is provided with a liquid outlet nozzle 410 which communicates with the liquid outlet channel 310. The annular part 500 is arranged at the outer circumference of one end of the valve stem assembly 300 and is connected to a side wall of the pressing head 400 close to the pump body 100. The annular part 500 is inserted into the accommodating cavity 110, and the outer circumference of the annular part 500 sealably abuts against the inner wall of the accommodating cavity 110. The annular part 500 is provided with a first channel 510 which communicates with the accommodating cavity 110, or a first channel 510 which communicates with the accommodating cavity 110 is provided between the annular part 500 and the valve stem assembly 300. The pressing head 400 is provided with a second channel 420 which communicates with the first channel 510. The second channel 420 has a first opening 421. The first opening 421 is disposed on the side wall of the pressing head 400 close to the pump body 100 and is located at an outer side of the annular part 500. The outer circumference of the pump body 100 is provided with a ventilation hole 130 capable of communicating with the accommodating cavity 110. The ventilation hole 130 is located between the annular part 500 and an end face of the piston 700 close to the liquid inlet 120. When the piston 700 is close to the liquid inlet 120, the ventilation hole 130 and the accommodating cavity 110 are in a communicated state.

Since the annular part 500 abuts against the inner wall of the accommodating cavity 110 in a closed manner, during an air supplementing process, it is difficult for external air and moisture to enter the accommodating cavity 110 from between the annular part 500 and the inner wall of the accommodating cavity 110. The external air needs to pass through the second channel 420, enter the first channel 510, then enter the accommodating cavity 110, and finally enter a container by means of the ventilation hole 130. By using the above arrangements, a direction in which air enters the second channel 420 from the first opening 421 is different from a direction in which air flows in the second channel 420. The direction in which air flows in the second channel 420 is also different from a direction in which air flows in the first channel 510. In this way, the length of an air supplementing path (referring to the dotted line shown in FIG. 2) may be increased, and the air supplementing path is caused to be tortuous. It is not easy for external moisture to enter the first channel 510 from the second channel 420 and further enter the accommodating cavity 110 of the pump body 100, such that the circumstances in which external moisture enters the interior of the pump body 100 is reduced, and the waterproof performance is improved.

Referring to FIG. 2, specifically, air needs to enter the second channel 420 from the first opening 421 along a direction from the pump body 100 to the pressing head 400, and air needs to flow in the first channel 510 along a direction from the pressing head 400 to the pump body 100. Therefore, during the process of external air flowing from the first opening 421 through the second channel 420 to the first channel 510, the external air needs to make at least two turns before the external air can enter the first channel 510, whereas it is difficult for external moisture to make two turns before entering the first channel 510. The second channel 420 substantially plays a role of blocking the passage of moisture, thereby reducing the circumstances in which external moisture enters the interior of the pump body 100.

In addition, by means of the above arrangements, it may not be necessary to make the first opening 421 relatively small to restrict moisture from entering the first channel 510, and the size of the first opening 421 can meet air supplementing requirements without making it easy for moisture to enter the first channel 510. In this way, the pressing pump provided in the present invention may be caused to smoothly supplement air and be operated easily while having good waterproof performance.

Specifically, when the valve stem assembly 300 and the piston 700 thereon move close to the liquid inlet 120, the one-way valve 200 closes the liquid inlet 120. Therefore, liquid at the bottom of the accommodating cavity 110 is input into the liquid outlet channel 310. In this case, the ventilation hole 130 communicates with the accommodating cavity 110. Therefore, air outside the container flows through the second channel 420, the first channel 510, the accommodating cavity 110 and the ventilation hole 130 in sequence and enters the container, so as to supplement air. During the process of the valve stem assembly 300 and the piston 700 thereon moving away from the liquid inlet 120, the ventilation hole 130 is located between the annular part 500 and the end face of the piston 700 close to the liquid inlet 120. That is, the piston 700 is at least partially located at one side of the ventilation hole 130 close to the liquid inlet 120, thereby ensuring that negative pressure is formed between the piston 700 and the liquid inlet 120. In this case, the one-way valve 200 opens the liquid inlet 120, such that liquid in the container is suctioned into the bottom of the accommodating cavity 110.

It should be noted that the dotted lines in FIGS. 2 and 3 indicate a part of the above air supplementing path, and the arrows in FIGS. 2 and 3 indicate a flow path direction of air during the air supplementing process.

Referring to FIGS. 1 and 2, it is conceivable that in some embodiments, there is a first gap between the annular part 500 and the valve stem assembly 300, and the first channel 510 is the first gap. In this case, the annular part 500 is sleeved on the valve stem assembly 300. By means of the above arrangements, it is easy to process the first channel 510, and the second channel 420 is also facilitated to communicate with the first channel 510.

Referring to FIGS. 1 and 2, it is conceivable that in some embodiments, the second channel 420 has a second opening 422 which is located on the side wall of the pressing head 400 close to the pump body 100 and is located at an inner side of the annular part 500. The second opening 422 communicates with the first channel 510. Therefore, a path in which air enters the second channel 420 from the first opening 421 forms an angle with a path in which air flows in the second channel 420, and the path in which air flows in the second channel 420 forms an angle with a path in which air flows in the first channel 510, thereby increasing resistance to the turning of moisture, and further reducing the circumstances in which moisture enters the first channel 510 from the second channel 420.

Figure 5:
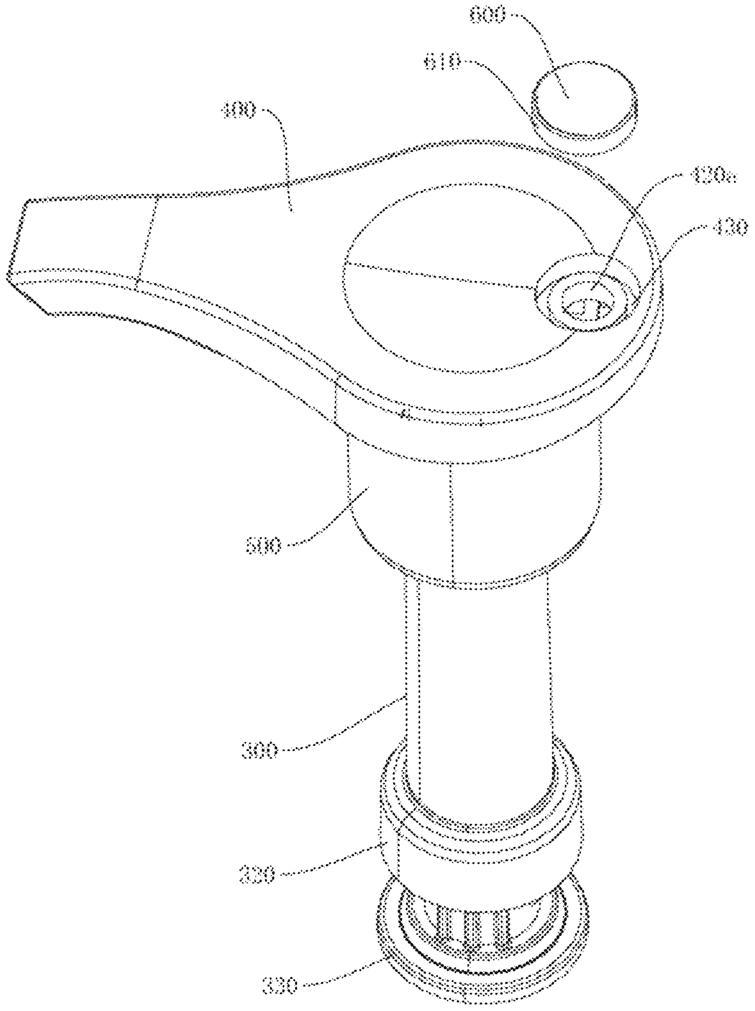
FIG. 5 is a schematic diagram of a valve stem assembly and a pressing head of the pressing pump shown in FIG. 1.
Figure 6:
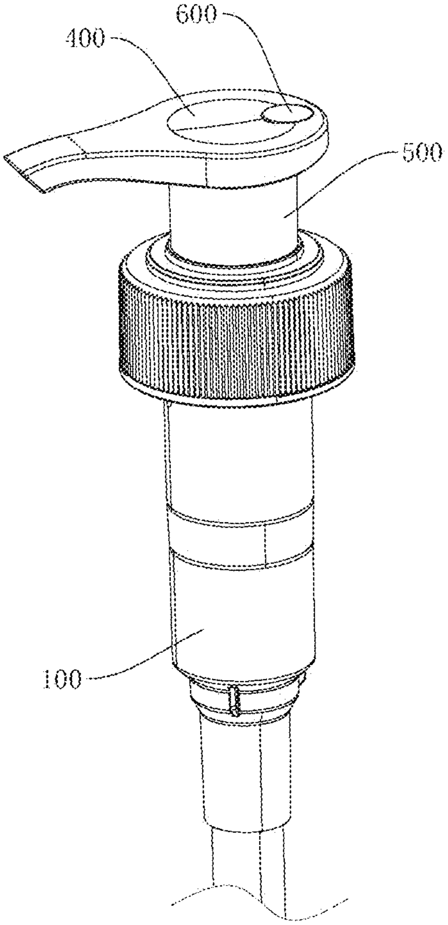
FIG. 6 is an external schematic diagram of the pressing pump shown in FIG. 1.

Referring to FIGS. 2 and 5, it is conceivable that in some embodiments, the pressing head 400 is provided with a first through hole 420*a* in an axial direction of the valve stem assembly 300. A closing cover 600 is mounted at one end of the first through hole 420*a* away from the valve stem assembly 300. The closing cover 600 and a side wall of the first through hole 420*a* are enclosed to form the second channel 420. That is, after the closing cover 600 closes the end of the first through hole 420*a* away from the valve stem assembly 300, the first through hole 420*a* forms the above second channel 420, wherein the annular part 500 partitions one end of the first through hole 420*a* close to the pump body 100, so as to form the first opening 421 and the second opening 422. By means of the above arrangements, the processing of the second channel 420 can be facilitated.

Referring to FIGS. 2 and 5, it is conceivable that in some embodiments, the closing cover 600 is provided with an annular brim 610. A side wall of the pressing head 400 away from the pump body 100 is provided with an annular clamping groove 430. The first through hole **420*a* is located at an inner side of the clamping groove 430. The brim 610 is embedded in the clamping groove 430. In this way, the effect of sealing between the closing cover 600 and the pressing head 400 can be ensured, and the closing cover 600 is also caused to be detachable. A water-absorbing component such as a sponge or activated carbon, or a breathing membrane may also be mounted in the second channel 420**, such that the detachment and replacement of the water-absorbing component or the breathing membrane can be facilitated.

Referring to FIG. 1, it is conceivable that in some embodiments, the pump body 100 comprises a tubular body **100*a* and a locking member 100*b* embedded in an upper end of the body 100*a*. A liquid storage cavity 111 is formed inside the body 100*a* and below the locking member 100*b*. The liquid inlet 120 communicates with a lower part of the liquid storage cavity 111. The locking member 100*b* is provided with a mounting cavity 112. The mounting cavity 112 communicates with the liquid storage cavity 111 by means of a second through hole 113. The accommodating cavity 110 comprises the liquid storage cavity 111, the mounting cavity 112 and the second through hole 113. The piston 700 is located in the liquid storage cavity 111. By means of the above arrangements, the piston 700 may be restricted in the liquid storage cavity 111 by means of the locking member 100*b*, and the mounting of the piston 700 and the valve stem assembly 300** is facilitated.

Referring to FIGS. 1 and 3, it is conceivable that in some embodiments, there is a second gap 140 between a lower end of the locking member **100*b* and an inner wall of the body 100*a*. The ventilation hole 130 is located at an upper side of a lower end face of the locking member 100*b* and communicates with the second gap 140. In this way, the length of the air supplementing path may further be increased, and the air supplementing path is caused to be more tortuous, thereby effectively reducing the circumstances in which moisture enters the interior of the container from the interior of the pump body 100 by means of the ventilation hole 130. Specifically, the valve stem assembly 300 passes through the mounting cavity 112, a communicating hole and the liquid storage cavity 111 in sequence. There is a third gap for air to pass between the valve stem assembly 300 and a side wall of the communicating hole. Therefore, external air passes through the second channel 420, the first channel 510, the mounting cavity 112, the third gap, the liquid storage cavity 111, the second gap 140 and the ventilation hole 130 in sequence, and then enters the container. In this case, if external moisture enters the pump body 100, it is difficult for the moisture to flow upwards from the liquid storage cavity 111 into the second gap 140, thereby reducing the circumstances in which moisture enters the interior of the container from the interior of the pump body 100 by means of the ventilation hole 130**.

Figure 4:
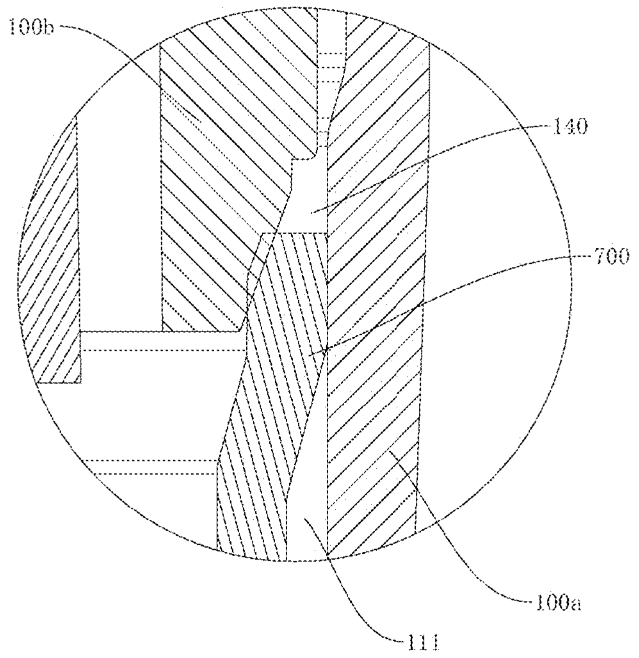
FIG. 4 is an enlarged view at C in FIG. 1.

Referring to FIGS. 1 and 4, it is conceivable that in some embodiments, when the piston 700 is away from the liquid inlet 120, an upper end of the piston 700 can block the second gap 140, such that the ventilation hole 130 is disconnected from the liquid storage cavity 111. In this way, when there is no need to squeeze liquid out of the container, that is, when the piston 700 is away from the liquid inlet 120, the interior of the container is disconnected from the outside, and external air will not enter the container, which is conducive to long-term storage of the liquid in the container. Specifically, when the piston 700 is far away from the liquid inlet 120, a circumferential edge of the upper end of the piston 700 may be embedded into the second gap 140 and block the second gap 140.

Referring to FIGS. 1 and 5, it is conceivable that in some embodiments, the outer circumference of the valve stem assembly 300 is provided with a first pushing part 320 and an annular second pushing part 330. The piston 700 is movably located between the first pushing part 320 and the second pushing part 330. The second pushing part 330 is located below the piston 700. An inlet 311 of the liquid outlet channel 310 is located between the first channel 510 and the second pushing part 330. A lower end face of the piston 700 can be away and separated from or close and fitted to the second pushing part 330. When the valve stem assembly 300 moves away from the liquid inlet 120, the lower end face of the piston 700 is fitted to the second pushing part 330, such that the liquid outlet channel 310 is disconnected from the liquid storage cavity 111. At the same time, the second pushing part 330 pushes the piston 700 to move away from the liquid inlet 120, thereby forming negative pressure in the liquid storage cavity 111. When the valve stem assembly 300 moves close to the liquid inlet 120, the first pushing part 320 pushes the piston 700 to move close to the liquid inlet 120. In this case, the second pushing part 330 is away and separated from the lower end face of the piston 700, the liquid outlet channel 310 communicates with the liquid storage cavity 111, and liquid in the liquid storage cavity 111 is input into the liquid outlet channel 310 and sprayed out from the liquid outlet nozzle 410. By means of the above arrangements, the piston 700 may control the connection and disconnection between the liquid outlet channel 310 and the liquid storage cavity 111.

It should be noted that in the present field, other arrangement modes may also be used to control the connection and disconnection between the liquid outlet channel 310 and the liquid storage cavity 111. For example, a ball valve is provided in the liquid outlet channel 310. When the valve stem assembly 300 moves close to the liquid inlet, the ball valve opens the liquid outlet channel 310. When the valve stem assembly 300 moves away from the liquid inlet, the ball valve closes the liquid outlet channel 310.

Referring to FIG. 1, it is conceivable that in some embodiments, springs 800 are arranged between the pressing head 400 and the pump body 100, and the springs 800 are used for resetting the pressing head 400. Specifically, the springs 800 are sleeved on the valve stem assembly 300. One end of each spring 800 is located in the mounting cavity 112, and the other end is located in the first channel 510.

A liquid container provided in a second embodiment of the present invention comprises the above pressing pump. By using the above pressing pump, the circumstances in which external moisture enters the container from the pressing pump to cause contamination can be reduced, and the waterproof performance is improved.

The technical features of the above embodiments can be combined arbitrarily. For concise, not all possible combinations of the various technical features in the above embodiments are described. However, as long as there is no contradiction in the combination of these technical features, they should be considered as falling within the scope of this specification.

The embodiments of the present invention are described in detail above with reference to the accompanying drawings, but the present invention is not limited to the above embodiments, and various changes may also be made within the knowledge scope of those of ordinary skills in the art without departing from the purpose of the present invention.

What is claimed is:

1. A pressing pump, comprising:

a pump body (100), provided with an accommodating cavity (110), the bottom of the accommodating cavity (110) being provided with a liquid inlet (120);

a one-way valve (200), arranged at the liquid inlet (120);

a valve stem assembly (300), movably arranged in the accommodating cavity (110), the valve stem assembly (300) being mounted with a piston (700), the piston (700) being located in the accommodating cavity (110), a circumferential edge of the piston (700) being fitted to and abutting against an inner wall of the accommodating cavity (110), the valve stem assembly (300) being provided with a liquid outlet channel (310) which communicates with the accommodating cavity (110), and the valve stem assembly (300) and the piston (700) being capable of being lifted and lowered relative to the liquid inlet (120);

a pressing head (400), located outside the pump body (100) and connected to one end of the valve stem assembly (300), the pressing head (400) being provided with a liquid outlet nozzle (410) which communicates with the liquid outlet channel (310); and an annular part (500), arranged at the outer circumference of one end of the valve stem assembly (300) and connected to a side wall of the pressing head (400) close to the pump body (100), the annular part (500) being inserted into the accommodating cavity (110), and the outer circumference of the annular part (500) sealably abutting against the inner wall of the accommodating cavity (110);

wherein the annular part (500) is provided with a first channel (510) which communicates with the accommodating cavity (110), or a first channel (510) which communicates with the accommodating cavity (110) is provided between the annular part (500) and the valve stem assembly (300), the pressing head (400) is provided with a second channel (420) which communicates with the first channel (510), the second channel (420) has a first opening (421), the first opening (421) is disposed on the side wall of the pressing head (400) close to the pump body (100) and is located at an outer side of the annular part (500), the outer circumference of the pump body (100) is provided with a ventilation hole (130) capable of communicating with the accommodating cavity (110), the ventilation hole (130) is located between the annular part (500) and an end face of the piston (700) close to the liquid inlet (120), and when the piston (700) is close to the liquid inlet (120), the ventilation hole (130) and the accommodating cavity (110) are in a communicated state.

2. The pressing pump according to claim 1, wherein there is a first gap between the annular part (500) and the valve stem assembly (300), and the first channel (510) is the first gap.

3. The pressing pump according to claim 1, wherein the second channel (420) has a second opening (422) which is located on the side wall of the pressing head (400) close to the pump body (100) and is located at an inner side of the annular part (500), and the second opening (422) communicates with the first channel (510).

4. The pressing pump according to claim 3, wherein the pressing head (400) is provided with a first through hole (420*a*) in an axial direction of the valve stem assembly (300), a closing cover (600) is mounted at one end of the first through hole (420*a*) away from the valve stem assembly (300), and the closing cover (600) and a side wall of the first through hole (420*a*) are enclosed to form the second channel (420).

5. The pressing pump according to claim 4, wherein the closing cover (600) is provided with an annular brim (610), a side wall of the pressing head (400) away from the pump body (100) is provided with an annular clamping groove (430), the first through hole (420*a*) is located at an inner side of the clamping groove (430), and the brim (610) is embedded in the clamping groove (430).

6. The pressing pump according to claim 1, wherein the pump body (100) comprises a tubular body (100*a*) and a locking member (100*b*) which is embedded in an upper end of the body (100*a*), a liquid storage cavity (111) is formed inside the body (100*a*) and below the locking member (100*b*), the liquid inlet (120) communicates with a lower part of the liquid storage cavity (111), the locking member (100*b*) is provided with a mounting cavity (112), the mounting cavity (112) communicates with the liquid storage cavity (111) by means of a second through hole (113), the accommodating cavity (110) comprises the liquid storage cavity (111), the mounting cavity (112) and the second through hole (113), and the piston (700) is located in the liquid storage cavity (111).

7. The pressing pump according to claim 6, wherein there is a second gap (140) between a lower end of the locking member (100*b*) and an inner wall of the body (100*a*), and the ventilation hole (130) is located at an upper side of a lower end face of the locking member (100*b*) and communicates with the second gap (140).

8. The pressing pump according to claim 7, wherein when the piston (700) is away from the liquid inlet (120), an upper end of the piston (700) can block the second gap (140).

9. The pressing pump according to claim 6, wherein a first pushing part (320) and an annular second pushing part (330) are arranged at the outer circumference of the valve stem assembly (300), the piston (700) is movably located between the first pushing part (320) and the second pushing part (330), the second pushing part (330) is located below the piston (700), an inlet (311) of the liquid outlet channel (310) is located between the first channel (510) and the second pushing part (330), and a lower end face of the piston (700) can be away and separated from or close and fitted to the second pushing part (330).

10. A liquid container, comprising the pressing pump according to claim 1.

* * * * *